(12) United States Patent
Barberis et al.

(10) Patent No.: US 11,922,815 B2
(45) Date of Patent: Mar. 5, 2024

(54) SYSTEM FOR MANAGING AUTOMATED VEHICLES

(71) Applicant: TELECOM ITALIA S.p.A., Milan (IT)

(72) Inventors: Sergio Barberis, Turin (IT); Mauro Renato Boldi, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 618 days.

(21) Appl. No.: 16/652,507

(22) PCT Filed: Oct. 15, 2018

(86) PCT No.: PCT/EP2018/078106
§ 371 (c)(1),
(2) Date: Mar. 31, 2020

(87) PCT Pub. No.: WO2019/081255
PCT Pub. Date: May 2, 2019

(65) Prior Publication Data
US 2020/0242944 A1    Jul. 30, 2020

(30) Foreign Application Priority Data
Oct. 23, 2017 (IT) ........................ 102017000119911

(51) Int. Cl.
*G06Q 50/30* (2012.01)
*B60W 60/00* (2020.01)
(Continued)

(52) U.S. Cl.
CPC ....... *G08G 1/202* (2013.01); *B60W 60/00253* (2020.02); *G01C 21/3438* (2013.01);
(Continued)

(58) Field of Classification Search
CPC ....... G06Q 50/28; G06Q 10/02; H04W 76/27; H04L 47/2416
See application file for complete search history.

(56) References Cited

U.S. PATENT DOCUMENTS

| | | | |
|---|---|---|---|
| 8,606,292 B1 * | 12/2013 | Cope | H04W 48/04 455/99 |
| 9,051,043 B1 * | 6/2015 | Peeters | H04L 67/12 |

(Continued)

FOREIGN PATENT DOCUMENTS

| | | |
|---|---|---|
| CN | 101071529 A | 11/2007 |
| CN | 101079729 A | 11/2007 |

(Continued)

OTHER PUBLICATIONS

N. P. Kuruvatti, A. Klein, J. Schneider and H. D. Schotten, "Exploiting diurnal user mobility for predicting cell transitions," 2013 IEEE Globecom Workshops (GC Wkshps), Atlanta, GA, USA, 2013, pp. 293-297, doi: 10.1109/GLOCOMW.2013.6825002. (Year: 2013).*

(Continued)

*Primary Examiner* — Scott M Tungate
(74) *Attorney, Agent, or Firm* — Oblon, McClelland, Maier & Neustadt, L.L.P.

(57) ABSTRACT

A method for managing data traffic of customers and self-driving vehicles includes receiving a transport request by a requesting customer, processing the received transport request, and identifying, among the self-driving vehicles, a compliant vehicle compliant with the transport request. The method also includes identifying a compliant route, compliant with the transport request, and causing the compliant vehicle to perform a transport service over the identified compliant route according to said transport request. identification of a compliant vehicle, identification of a compliant route, and causation of the compliant vehicle to perform a transport service are based on information about the mobile (Continued)

Figure 1:
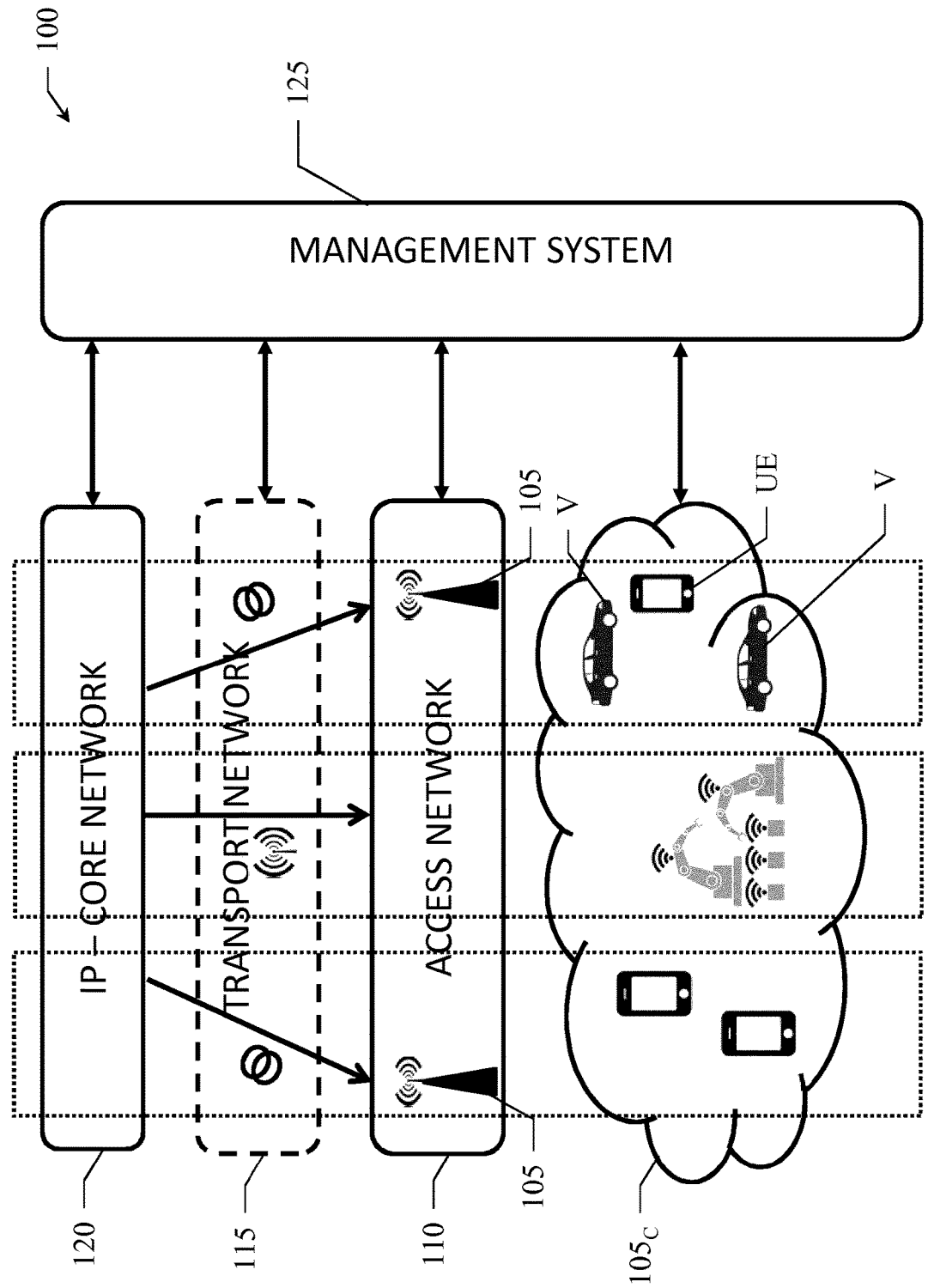

communication network, information about the compliant vehicle, and information about a radio state in the mobile communication network between the customers, between the vehicles, and between the customers and the vehicles.

15 Claims, 4 Drawing Sheets

(51) Int. Cl.
    *G01C 21/34* (2006.01)
    *G06Q 10/02* (2012.01)
    *G08G 1/00* (2006.01)
    *H04L 47/2416* (2022.01)
    *H04W 76/27* (2018.01)

(52) U.S. Cl.
    CPC ......... *G01C 21/3453* (2013.01); *G06Q 10/02* (2013.01); *G06Q 50/30* (2013.01); *H04L 47/2416* (2013.01); *H04W 76/27* (2018.02)

(56) References Cited

U.S. PATENT DOCUMENTS

| | | | | |
|---|---|---|---|---|
| 9,557,183 | B1* | 1/2017 | Ross | G06Q 50/30 |
| 9,706,515 | B1* | 7/2017 | Chadwick | H04W 8/20 |
| 10,231,113 | B1* | 3/2019 | Huang | H04W 8/04 |
| 2014/0315564 | A1* | 10/2014 | Conway | H04W 4/029 |
| | | | | 455/452.1 |
| 2015/0339928 | A1 | 11/2015 | Ramanujam | |
| 2016/0323715 | A1* | 11/2016 | Leroux | H04W 4/029 |
| 2017/0105146 | A1* | 4/2017 | Zeng | H04W 28/26 |
| 2017/0123421 | A1 | 5/2017 | Kentley et al. | |
| 2017/0213308 | A1 | 7/2017 | Wellborn et al. | |
| 2018/0213446 | A1* | 7/2018 | Chun | H04W 8/24 |
| 2018/0356821 | A1 | 12/2018 | Kentley-Klay et al. | |

FOREIGN PATENT DOCUMENTS

| | | |
|---|---|---|
| CN | 101189887 A | 5/2008 |
| CN | 101485216 A | 7/2009 |
| CN | 101772967 A | 7/2010 |
| CN | 103090878 A | 5/2013 |
| CN | 106323310 A | 1/2017 |
| CN | 107063286 A | 8/2017 |

OTHER PUBLICATIONS

International Search Report and Written Opinion dated Feb. 1, 2019 in PCT/EP2018/078106 filed on Oct. 15, 2018.
Office Action dated Nov. 9, 2021 in corresponding Chinese Patent Application No. 201880068949.1 (with English Translation), citing documents AO-AR therein, 17 pages.
Combined Chinese Office Action and Search Report dated Jan. 6, 2022 in Chinese Patent Application No. 201880068949.1 (submitting English translation only), citing documents AO through AR therein, 13 pages.
Office Action dated Jul. 18, 2023, in corresponding European Patent Application No. 18 796 593.4. 5 pages.

* cited by examiner

SYSTEM FOR MANAGING AUTOMATED VEHICLES

BACKGROUND OF THE INVENTION

Field of the Invention

The present invention generally relates to fifth generation (5G) mobile communication networks. Particularly, the present invention relates to a system for managing automated vehicles through such 5G mobile communication networks.

Overview of the Related Art

The present invention is based on a foreseen evolution of the "automotive" scenario, that is one of the scenarios identified for the development of the 5G mobile communication networks, in particular related to the services known as MTC ("Machine Type Communications") and URLLC ("Ultra Reliable Low Latency Communications") that will be the basis for the development of many heterogeneous use cases. One of these use cases will be based on the inclusion of the automotive "vertical" into the new telecommunication system, and particularly of the so-called "connected vehicles"—i.e. vehicles reciprocally connected and connected to a wide area network managed by the 5G mobile communication network operator.

In the present invention an experimental environment is envisaged in which all the connected vehicles are automated or self-driving vehicles, i.e. vehicles that need no human control (or with optional human control). In such an environment, a fundamental role will be played by the management of the data and route traffic generated by the automated vehicles.

3GPP TR 22.886, "Study on enhancement of 3GPP Support for 5G V2X Services (Release 15)", v 15.0.0, discloses requirements to be satisfied by 5G mobile communications networks in order to support advanced automotive applications (such as, for example, those automotive applications expected to be requested by a fully automated driving system).

WO2015169204 discloses a self-driving car scheduling method, a car scheduling server and a self-driving car. The method comprises: receiving a request for taking a car; according to the request for taking a car and travel information about various self-driving cars within the range of management, determining at least one first candidate car in a plurality of self-driving cars; according to current position information, current road condition information and planned route information about each first candidate car, calculating a first time required by each first candidate car to reach a destination for taking a car; according to the first time corresponding to each first candidate car, determining the final candidate car in the at least one first candidate car, the final candidate car at least satisfying the expected time of reaching the destination; and issuing the request for taking a car to the final candidate car.

3GPP TR 22.891, "Feasibility study on new services and markets technology enablers Stage 1, (release 14)", v 14.2.0 discloses how positioning nodes are coordinated with enhanced cellular communication base stations to form a carrier-grade telecommunication and positioning network.

SUMMARY OF INVENTION

The Applicant has found that none of the above-cited prior art documents considers a joint approach taking advantage of the knowledge of both the situation of the autonomous vehicle fleet and related vehicular traffic information, and the mobile communication network status and correspondent subscriber related information.

In view of the above, the Applicant has tackled the above mentioned issues and has devised a method for managing data traffic of customers and self-driving vehicles jointly.

One or more aspects of the present invention are set out in the independent claims, with advantageous features of the same solution that are set forth in the dependent claims (whose wording is enclosed herein verbatim by reference).

More particularly, an aspect of the present invention relates to a method for managing data traffic of customers and self-driving vehicles, wherein the customers and the self-driving vehicles are connected to a mobile communication network. The method comprises:
  receiving a transport request by a requesting customer;
  processing the received transport request and identifying, among the self-driving vehicles, a compliant vehicle that is compliant with the transport request;
  identifying a compliant route, compliant with the transport request, to be taken by the identified compliant vehicle from a starting position to one or more target positions set out in the transport request, and
  causing the compliant vehicle to perform a transport service over the identified compliant route according to said transport request.

Said identifying a compliant vehicle, said identifying a compliant route and said causing the compliant vehicle to perform a transport service are preferably based on information about the mobile communication network, information about the compliant vehicle, and information about a radio state in the mobile communication network between the customers, between the vehicles and between the customers and the vehicles.

According to an embodiment of the present invention, the method further comprises, during said transport service, arranging radio resources of the mobile communication network for the customers and the self-driving vehicles connected to the mobile communication network according to said information about the mobile communication network, to said information about the compliant vehicle, and to said information about a radio state in the mobile communication network.

According to an embodiment of the present invention, said identifying a compliant route further comprises:
  checking the presence of perturbing events and an impact thereof on the identified compliant route, and
  identifying a further compliant route alternative to the compliant route if, as a result of the perturbing events, the identified compliant route is no longer compliant with the transport request.

Additionally or alternatively to checking the presence of perturbing events affecting the identified compliant route, the method may comprise checking the presence of perturbing events affecting the mobile network, and assigning additionally radio resources or redistribute the radio resources already assigned.

According to an embodiment of the present invention, said checking the presence of perturbing events and an impact thereof on a traffic of the identified compliant route, and said identifying a further compliant route alternative to the compliant route are carried out before causing the compliant vehicle to perform the transport service and/or during the transport service.

According to an embodiment of the present invention, said arranging radio resources further comprises arranging radio resources of the mobile communication network for the customers and the self-driving vehicles connected to the mobile communication network according to the identified further compliant route.

According to an embodiment of the present invention, said information about the mobile communication network comprises at least one among:
- adopted frequency bands;
- used bandwidths;
- radio transmission parameters;
- set of radio resource management procedures;
- context-aware reconfigurations, and
- distribution of mobile communication network functionalities.

According to an embodiment of the present invention, said identifying a compliant vehicle comprises:
- identifying that vehicle, among the self-driving vehicles, that matches with transport features set out in the transport request, and/or
- identifying that vehicle, among the self-driving vehicles, that is as near as possible to the starting position.

According to an embodiment of the present invention, said starting position is a current position of the requesting customer or an arbitrary position set out by the requesting customer in the transport request.

According to an embodiment of the present invention, the method further comprises classifying the customers according to classes of priority, said identifying a compliant route preferably comprising identifying or generating a dedicated route for the requesting customer if the requesting customer belongs to a predefined class of priority.

According to an embodiment of the present invention, said classifying the customers according to classes of priority comprises classifying a human customer according to a respective subscription cost and/or classifying a vehicle according to an importance or urgency of the offered transport service.

According to an embodiment of the present invention, the method further comprises associating the self-driving vehicles to respective parking lots based on a distribution of the data traffic of the mobile communication network.

According to an embodiment of the present invention, the method further comprises estimating said distribution of the data traffic of the mobile communication network according to customer position and/or associated serving cells.

According to an embodiment of the present invention, the method further comprises partitioning an area covered by the mobile communication network in a number of regions each one associated with a respective parking lot according to a Voronoi diagram, preferably said estimating the distribution of the data traffic of the mobile communication network being also based on a ratio between the data traffic associated with each region and the data traffic associated with said area.

According to an embodiment of the present invention, said associating the self-driving vehicles to respective parking lots comprises, for each region, associating a vehicle to the parking lot associated with that region if the ratio between the data traffic associated with that region and the data traffic associated with said area substantially corresponds to a ratio between a number of self-driving vehicles currently parked at that parking lot and a number of vehicles within said area.

According to an embodiment of the present invention, said identifying that vehicle that is as near as possible to the starting position is also based on said partitioning an area covered by the mobile communication network in a number of regions.

Another aspect of the present invention relates to a system for managing data traffic of customers and self-driving vehicles, wherein the customers and the self-driving vehicles are connected to a mobile communication network. The system comprises:
- a first module for receiving a transport request by a requesting customer;
- a second module for processing the received transport request and identifying, among the self-driving vehicles, a compliant vehicle that is compliant with the transport request;
- a third module for identifying a compliant route, compliant with the transport request, to be taken by the identified compliant vehicle from a starting position to one or more target positions set out in the transport request.

The first module is arranged for causing the compliant vehicle to perform a transport service over the identified compliant route according to said transport request, Preferably, said identifying a compliant vehicle, said identifying a compliant route and said causing the compliant vehicle to perform a transport service are based on information about the mobile communication network, information about the compliant vehicle, and information about a radio state in the mobile communication network between the customers, between the vehicles and between the customers and the vehicles.

Thanks to the present invention, large reduction in traffic issues in the cities, significant improvement of the parking problems, security improvement in the traffic among vehicles and among vehicles and (human and/or non-human) customers, and new economic opportunities for many different players in the telecommunication and automotive industries are made possible.

BRIEF DESCRIPTION OF THE ANNEXED DRAWINGS

Figure 2:
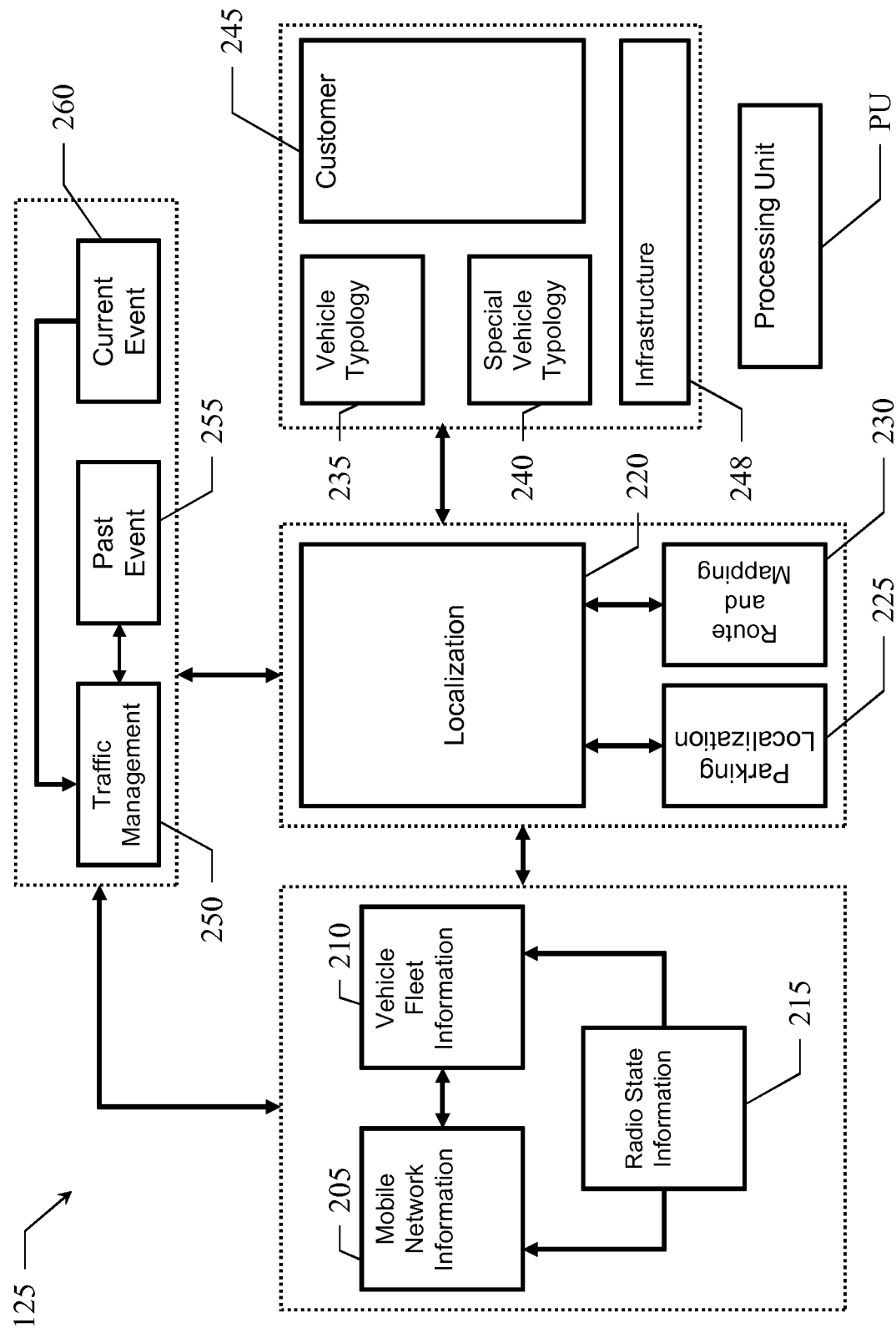
Figure 3:
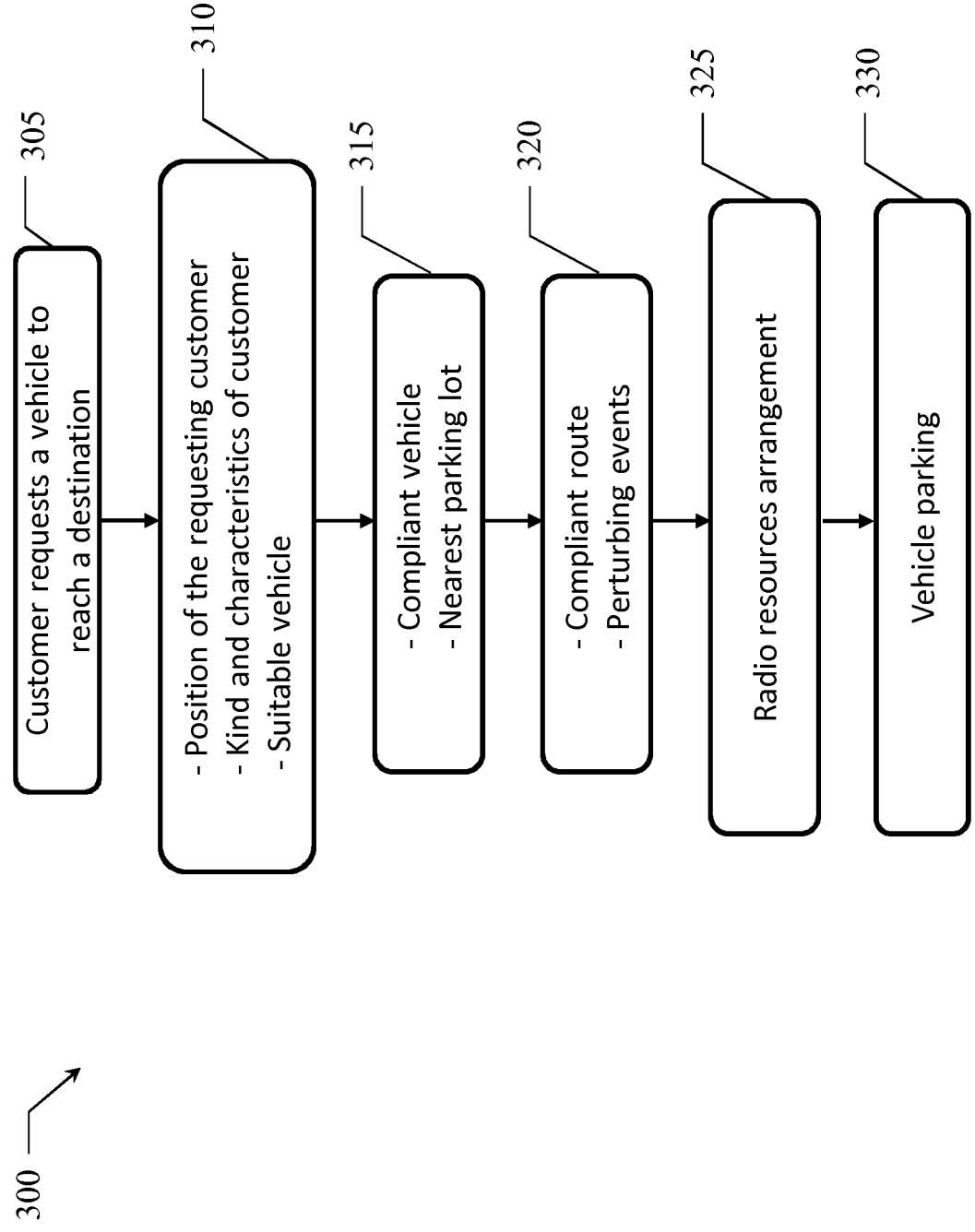
Figure 4:
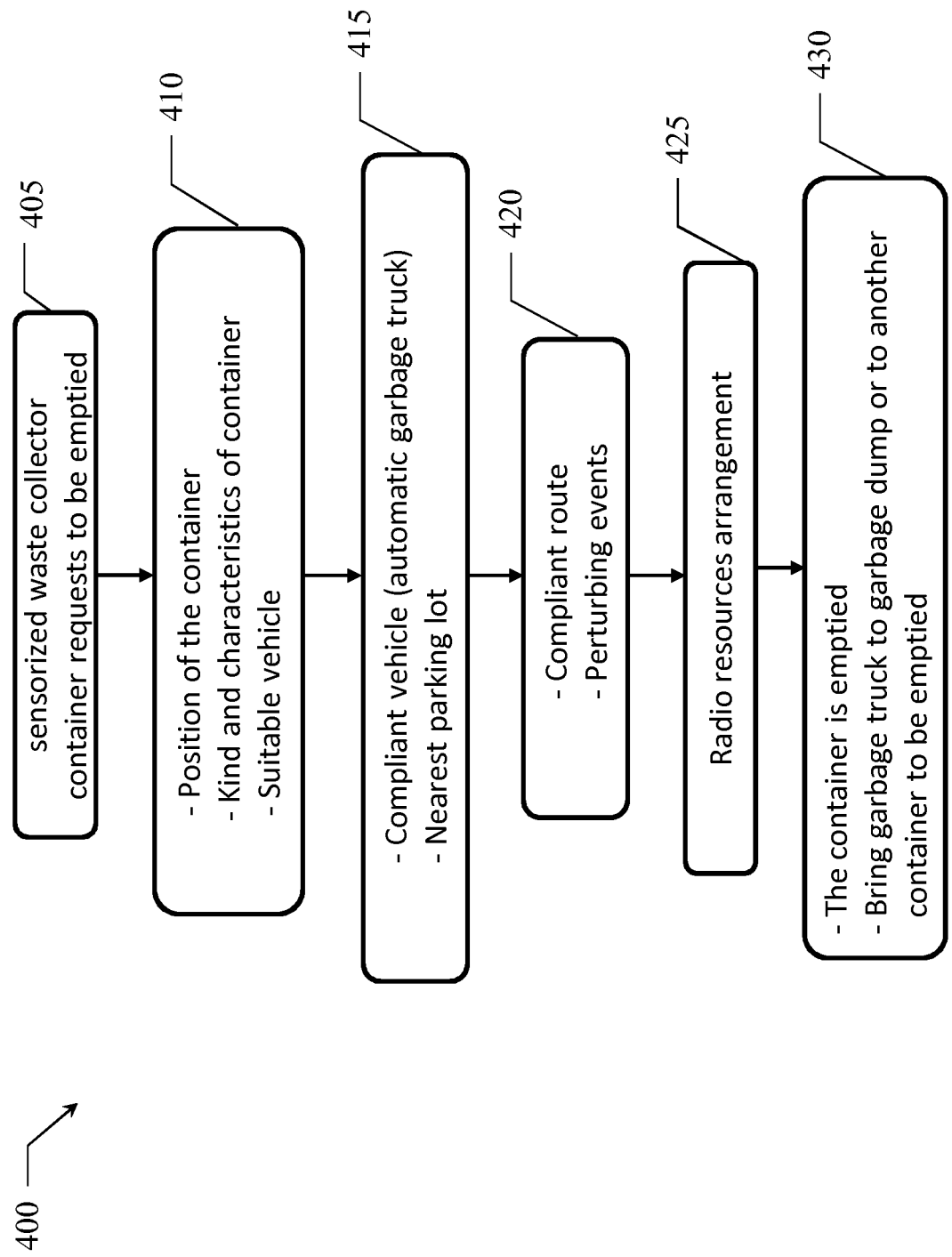

These and other features and advantages of the present invention will be made apparent by the following description of some exemplary and non-limitative embodiments thereof. For its better intelligibility, the following description should be read making reference to the attached drawings, wherein:

FIG. 1 schematically shows a mobile communication network according to an embodiment of the present invention;

FIG. 2 schematically shows, in terms of functional blocks and modules thereof, a management system of the mobile communication network according to an embodiment of the present invention, and FIGS. 3 and 4 show main steps of procedures for managing data traffic, according to respective embodiments of the present invention.

DETAILED DESCRIPTION OF PREFERRED EMBODIMENTS OF THE INVENTION

With reference to the drawings, FIG. 1 schematically shows a mobile communication network (hereinafter, mobile network) 100 according to an embodiment of the present invention.

The mobile network 100 is for example compliant with the upcoming 5th generation (5G) mobile networks.

The mobile network 100 may for example comprise a number of base stations, only two base stations 105 in the illustrated example, which form the access network 110 and provide radio coverage over an area 105c served by the mobile network 100 (hereinafter, served area). In turn, the access network 110 is generally communicably coupled, through a transport network 115, to one or more core networks 120 (for example, an IP core network).

The mobile network 100 allows data traffic to be exchanged between different kinds of communication devices, for example "Internet of Things" (IoT) communication devices (i.e. electronic devices provided with both internet connection capabilities and autonomous computational capabilities), preferably according to a vertical market structure (i.e. a market in which vendors offer goods and services specifically to an industry, trade, to professional customers, or to other group of customers with specialized needs). For the purposes of the present invention and disclosure, an automotive vertical market is considered that allows data traffic to be exchanged between customers and smart vehicles connected to the mobile network 100—however, as generically illustrated in FIG. 1, other vertical markets may be additionally provided, such as a vertical market allowing data traffic to be exchanged between user portable or mobile terminals, and/or a vertical market allowing data traffic to be exchanged between industrial machineries (such as industrial robots).

The data traffic exchanged between customers and smart vehicles comprises, for example, data traffic exchanged between the customers, data traffic exchanged between the smart vehicles, and/or data traffic exchanged between the customers and the smart vehicles.

Broadly speaking, each base station 105 allows the data traffic exchange between the customers and the smart vehicles according to predefined radio resource allocation procedures (see, for example, O. Bulakci et al, "*Agile Resource Management for 5G—A METIS II perspective*", CSCN 2015). For the purposes of the present invention, by "radio resource" it is meant a spectrum portion, a space portion in the time/frequency/codes domains, and/or hardware and software used for communication.

Although in the following description explicit reference is made to data traffic exchange between the customers and the smart vehicles, other data traffic exchange modes may also be provided (such as data traffic directly exchanged between the smart vehicles based on "Vehicle-to-Vehicle" communications or other "Direct Device-to-Device" communications).

As will be better understood from the following discussion, the customers may for example be human or non-human customers. In the exemplary scenario illustrated in FIG. 1, human customers are connected to the mobile communication network 100 through respective user equipment UE. The user equipment UE may for example comprise user portable or mobile terminals (as exemplarily illustrated in the figure).

In the exemplary considered scenario, the smart vehicles comprise one or more (preferably, a fleet of) automated or self-driving vehicles V, i.e. vehicles that need no human control (or with optional human control).

According to the present invention, the data traffic of the customers and of the self-driving vehicles is jointly managed by the mobile network 100, for example by means of a management system 125 communicably coupled with the access network 110, the transport network 115 and the core network 120.

FIG. 2 schematically shows, in terms of functional blocks and modules thereof, a management system 125 according to an embodiment of the present invention. The blocks and modules discussed in the following are preferably handled and accessed by a processing unit PU of the management system 125.

The management system 125 preferably comprises a transmission block, where the functions and databases related to the mobile network, to automotive-based communication network and to radio resource (for example, interference) management are located. According to the illustrated embodiment, the transmission block comprises the following modules:

- a mobile network information module 205. This module is intended to store and provide to the processing unit PU (connection not shown), as well as to other modules of the management system, information about the mobile network (hereinafter, mobile network information). Preferably, although not necessarily, the mobile network information comprises at least one among adopted frequency bands, used bandwidths, transmission parameters (e.g., frame duration, subframe duration, slot duration, symbol duration, subcarrier spacing, sampling frequency, number of subcarrier, resource block per subframe), set of RRM ("Radio Resource Management") procedures, context-aware reconfigurations, and distributions of mobile network functionalities (for example, by distinguishing mobile network functionalities that are distributed in the network nodes from mobile network functionalities that are centrally located in the cloud);
- a vehicle fleet information module 210. This module is intended to store and provide to the processing unit PU (connection not shown), as well as to other modules of the management system, information about the vehicle fleet. The information about the vehicle fleet may comprise, for example, information about the number, types and/or categories of the vehicles in the vehicle fleet, information about the capability of each vehicle to act as a nomadic node (i.e. a node that, while moving from location to location, is stationary for a relatively long period of time at each location, and that can act as temporary radio access node providing radio access to nearby wireless devices), and information about the "Vehicle-to-Vehicle" capabilities of each vehicle;
- a radio state information module 215. This module is intended to store and provide to the processing unit PU (connection not shown), as well as to other modules of the management system, the information (hereinafter referred to as radio state information) about a state of the mobile network. Radio state information may comprise at least one among radio resource availability, radio resource typology, radio resource coverage (i.e. the area(s) to which radio resources are or are not assigned) and radio interference information (i.e., information useful and necessary to control the radio interference in the mobile network between the customers, between the vehicles and between the customers and the vehicles).

Preferably, the management system 125 also comprises a localization block, where the functions and databases about the localization of vehicles and (humans and non-humans) customers, about parking lot locations and about routes identifications and related geo-localization are included. According to the illustrated embodiment, the localization block comprises the following modules:

a localization module 220. This module is intended to store, manage and provide to the processing unit PU (connection not shown), as well as to other modules of the management system, the localization of the vehicles and (humans and non-humans) customers connected to the mobile network. The localization of the vehicles and (humans and non-humans) customers connected to the mobile network may be based on GPS data; GPS data can for example be received from dedicated GPS modules provided in the vehicles and non-human customers, and from portable terminals (such as mobile phones) of the human customers (in any case, GPS data may be combined to data traffic of the vehicles, of the non-human customers and of the mobile phones);

a parking localization module 225. This module works in close cooperation with the localization module 220 and is intended to manage and provide to the processing unit PU (connection not shown), as well as to other modules of the management system, information about the location and status of the parking lots placed in the geographic area served by the mobile network (i.e., the places in which the vehicles are stored whenever not used);

a route and mapping module 230. This module is intended to store topography information (such as topography maps of the geographic area served by the mobile network) for allowing the processing unit PU to derive best routes (i.e. routes compliant with transport request) in a dynamic way, as well as to store the possible routes already computed and implemented. The route and mapping module 230 may for example be based on the teachings disclosed in Falko Schmid, Kai-Florian Richter, Denise Peters, "*Route Aware Maps: Multigranular Wayfinding Assistance*", SFB/TR 8 Spatial Cognition, University of Bremen, Germany, or on the approaches disclosed in Carlo Giacomo Prato, "*Route Choice Modeling: Past, Present and Future Research Directions*", Transportation Research Institute, Technion—Israel Institute of Technology, Technion City, Haifa 32000, Israel.

Preferably, the management system 125 also comprises a typology block. According to the illustrated embodiment, the typology block comprises the following modules:

a vehicle typology module 235. This module is for example in the form of a database and may for example store (and provide to the processing unit PU upon request (connection not shown), as well as to other modules of the management system) information (hereinafter, vehicle typology information) about the types (such as size, space for baggage, number of people potentially transportable) of vehicles that are active in the served area;

a special vehicle typology module 240. This module is for example in the form of a database and may for example store (and provide to the processing unit PU upon request (connection not shown), as well as to other modules of the management system) information (hereinafter, special vehicle typology information) about the types of special vehicles (for example, ambulances or other rescue or emergency vehicles) that are active in the served area. The special vehicle typology information is important to manage special vehicles in a preferential way with respect to the other vehicles;

a customer module 245. This module is for example in the form of a database and may for example store (and provide to the processing unit PU upon request (connection not shown), as well as to other modules of the management system) information (hereinafter, customer information) about the type of customers (such as human or non-human customers, and/or customers belonging to predetermined classes of priority (the priority being assigned to a customer according to, for example, a subscription cost or an emergency rescue);

an infrastructure module 248. This module is for example in the form of a database and may for example store (and provide to the processing unit PU upon request (connection not shown), as well as to other modules of the management system) information (hereinafter, infrastructure information) about the infrastructures (such as streets, traffic lights of the served area) involved in the transport service and the smart or internet functionalities supported by them.

Preferably, the management system 125 further comprises a traffic block. According to the illustrated embodiment, the traffic block comprises the following modules:

a traffic management module 250. This module is responsible of the management of the route traffic generated by (humans and/or not humans) customers and vehicles in the served area, and may also contain information about traffic regulation and related management in real time. The traffic management module 250 may for example be implemented according to the algorithm disclosed in Partha Sarathi Chakraborty, Prajeeth Nair, Pranshu Raj Sinha and Ishan Kumar, "*Real Time Optimized Traffic Management Algorithm*", Behera International Journal of Computer Science & Information Technology (IJCSIT) Vol 6, No 4, August 2014;

a past event module 255. This module, which can be for example in the form of a repository, is responsible of the collection of all the past events happened in the served area in terms of route traffic (i.e., traffic generated by customers and vehicles). This could be the case of, for example, recurring religious celebrations or recurring events;

a current event module 260. This module can be for example in the form of a database storing events that are happening in real time in the served area, and encompassing for example the events related to customers and to vehicles in a coordinated way (such as accidents, gathering of people, weather conditions, works in progress).

During operation, one or more of the modules of the management system 125 interact with each other and with the processing unit PU in order to manage the data traffic of the customers and of the vehicles. For the purpose of the present invention, by data traffic is meant the data traffic generated for guaranteeing voice call, messages, and internet services, as well as the data traffic generated for handling the route traffic of the vehicles (and, hence, for controlling the vehicles) in the served area.

According to the principles of present invention, the management system 125 is configured for:

receiving a transport request by a requesting customer (the transport request being preferably received through connection of the requesting customer to the base station and the connection of the base station to the management system 125);

processing the received transport request and identifying, among the self-driving vehicles, a compliant vehicle that is compliant with the transport request;

identifying a compliant route, compliant with the transport request, to be taken by the identified compliant vehicle from a starting position to one or more target positions set out in the transport request, and causing or controlling or enabling the compliant vehicle to perform a transport service over the identified compliant route according to said transport request (the compliant vehicle being caused to perform the transport service over the identified compliant route preferably based on instructions provided by the processing unit PU or by a dedicated instruction module, not shown), wherein the identification of the compliant vehicle, the identification of the compliant route and the control of the compliant vehicle to perform the transport service are based on mobile network information (contained in the mobile network information module 205), on vehicle information related to the compliant vehicle (for example the vehicle information can include information about the vehicle fleet contained in the vehicle fleet information module 210, the vehicle typology information contained in the vehicle typology module 235 and the special vehicle typology information contained in the special vehicle typology module 240), and on radio state information (contained in the radio state information module 215).

Preferably, as discussed below through practical use cases, the management system 125 is also configured for, during the transport service, arranging radio resources for the customers and the self-driving vehicles connected to the mobile network according to the mobile network information, the vehicle information related to the compliant vehicle, and the radio state information. In this way, both standard data traffic (e.g., for voice and multimedia services) and very short latency data traffic (for the control of the self-driving vehicles) are jointly and synergistically handled by the management system 125.

In the following, the above-cited principles of the present invention, as well as advantageous features thereof, will be discussed through discussion of exemplary practical use cases. In the exemplary use cases discussed in the following, all the vehicles are assumed to be self-driving vehicles controlled by the management system 110: in any case, the principles of the present invention may equivalently be applied to uses cases wherein both human-driven vehicles and self-driving vehicles coexist. Moreover, according to the wide variety of specific scenarios that can be implemented, the steps discussed in connection with a specific use case may be combined, at least in part, with one or more of the steps illustrated for one or more of the other use cases.

Exemplary use case (i): a human customer has to go from a departure position to a destination position of a city where both telecommunication traffic and autonomous vehicle traffic are managed by the management system 125. In the following, reference will be made to FIG. 3, which shows, according to an embodiment of the present invention, the main steps of a procedure for managing the data traffic in this exemplary use case.

Step 305) The requesting customer, located at the starting position, requests an automatic vehicle at a given time because he/she has to reach the target or destination position (alternatively, the requesting customer may also be not located at the starting position, in which case the transport request may also be booked in advance by indicating the starting position). The transport request may for example be done through the mobile device (e.g., a smartphone) of the requesting customer. The transport request may also include details or features related to the desired vehicle (e.g., large vehicle due to heavy luggage). Preferably, the transport requests (or at least a subset thereof) are received at the processing unit PU of the management system 125 (even more preferably, the transport requests are stored in proper memory locations of the processing unit PU waiting for being handled). However, nothing prevents from having a dedicated module (i.e. a module external to the processing unit PU) for receiving the transport requests and/or dedicated memory locations (i.e., memory locations external to the processing unit PU and/or to the dedicated module) for storing the transport requests waiting for being handled).

Step 310) The management system 125 determines, through the localization module 220, the current position of the requesting customer (if the starting position is not an arbitrary starting position indicated in the transport request), then it determines, through the customer module 245, the kind of customer and characteristics thereof, and finally it identifies, through the vehicle typology module 235, the most suitable vehicle that matches with the transport features set out in the transport request (i.e. the compliant vehicle).

Step 315) According to the determined position (or to the indicated starting position) the management system 125 identifies the compliant vehicle that is as near as possible to the starting position. According to an embodiment, when the vehicles are parked in the respective parking lots, the management system 125 identifies, through the parking localization module 225, the nearest parking lot (with respect to the starting position) where it is available the compliant vehicle matching the transport request. Preferably, the nearest parking lot with respect to the location of the requesting customer asking for a transport service (or, more in general, the compliant vehicle that is as near as possible to the starting position) is identified based on a distribution of the data traffic of the mobile network and, preferably, according to a tessellation of the served area based on such a distribution (as better discussed in the following, such a tessellation being for example achieved by means of a Voronoi diagram covering the entire served area and formed by partitioning the served area in a number regions).

Step 320) The management system 125, by means of the route and mapping module 230, identifies the compliant or best routes to be taken by the compliant vehicle from the parking lot to the starting position (when the position of the parking lot and of the starting position do not coincide) and from the starting position to the target position. Preferably, before starting the transport service according to the identified compliant route, and/or during the transport service, the management system 125 checks the presence of perturbing events and an impact thereof on the identified compliant route. In order to achieve it, the management system 125, through the traffic management module 250 and/or the past event module 255 and/or the current event module 260) identifies expected or unexpected events and their impact on the traffic of the identified compliant route, and, through the route and mapping module 230, identifies new compliant routes (e.g., alternative routes) if necessary (e.g., if, as a result of the perturbing events, the previously identified route is no longer compliant with the transport request). Based on the identified compliant route(s), the vehicle leaves the parking lot and, reaches the starting position, picks up the requesting customer and brings him/her to the target position. Additionally or alternatively to checking the presence of perturbing events affecting the identified compliant route, the management system 125 may check the presence of perturbing events affecting the mobile network (for example, a local increase in the data traffic that determines congestion issues), in which case additionally or alternatively to the identification of new compliant routes, the management system 125 may assign additionally radio resources or redistribute the radio resources already assigned.

Step 325) During the transport service the requesting customer may decide to place a call or to request a telecommunication service using his mobile device. In such a case, the management system 125, taking into account the mobile network information provided by the mobile network information module 205 and/or the vehicle fleet information provided by the vehicle fleet information module 210 and/or the radio state information provided by the radio state information module 215, may arrange (or cause the base station to arrange) the radio resources (and, preferably, the radio control procedures) of the mobile network—however, the arrangement of the radio resources may be performed in response to any service or communication requested by the customers and/or vehicles of the mobile network. For example, according to the radio resources required by the telecommunication service, radio resources can be reserved in advance (taking into account also the prior knowledge of the compliant route) and managed in order to minimize mutual interferences with other active connections. In a similar way, the mobility management procedures can take into account in advance the deterministic route of the customer as well as the context information deriving by the knowledge of the overall vehicular and customer densities derived by the localization module 220. Additionally or alternatively, the arrangement of the radio resources may be performed in response to the alternative compliant route(s) possibly identified at step 320).

Step 330) Once the vehicle reaches the target position, the requesting customer gets off and the vehicle is addressed toward the parking lot associated therewith or toward the parking lot that is as near as possible to the vehicle current position. However, in some embodiments of the present invention, vehicle addressing toward a parking lot does not take place (in which case the vehicle is left parked at or close to the target position of the just-served requesting customer).

Exemplary use case (ii): a non-human customer asks for a transport service to be provided by an automatic dedicated special vehicle. Just as an example, let it be considered a sensorized waste collector container that, when full, autonomously requests to be emptied through an automatic self-driving garbage truck. In the following, reference will be made to FIG. 4, which shows, according to an embodiment of the present invention, the main steps of a procedure for managing the data traffic in this exemplary use case—some steps similar to those discussed in connection with exemplary use case (i)) will be summarized.

Step 405) When full, the sensorized waste collector container, e.g. through an "Internet of Things" (IoT) communication device housed therein (i.e. an electronic device provided with both internet connection capabilities and autonomous computational capabilities), informs the control room of the local garbage company that it needs to be emptied. Similarly to the above (see step 305), the transport request (which in this case is informing the control room of the local garbage company that the sensorized waste collector container needs to be emptied) is received at the processing unit PU of the management system 125 (or at a dedicated module, not shown), with the number of transport requests that are preferably stored in proper memory locations of the processing unit PU and/or in dedicated memory locations external to the processing unit PU and/or to the dedicated module;

Step 410) The local garbage company informs the management system 125 of this need. The management system 125 in turns determines, through the localization module 220, the position of the sensorized waste collector container, then it determines, through the customer module 245, the kind of customer and characteristics thereof, and finally it identifies, through the special vehicle typology module 240, the most suitable kind of vehicle with respect to the transport request (in this case, an automatic garbage truck);

Step 415) According to the determined position, the management system 125 identifies, through the parking localization module 225, the nearest available automatic garbage truck;

Step 420) The management system 125, by means of the route and mapping module 230, identifies the compliant route to be taken by the automatic garbage truck from its current position (e.g. the garbage dump or the position of a previously-emptied sensorized waste collector container, as better detailed below) to the position of the sensorized waste collector container to be emptied. Preferably, before starting the transport service according to the identified compliant route, the management system 125 checks possible perturbing events. In order to achieve it, the management system 125, through the traffic management module 250 and/or the past event module 255 and/or the current event module 260) identifies expected or unexpected events and their impact on the traffic of the identified compliant routes, and, through the route and mapping module 230, identifies new compliant routes (e.g., alternative routes) if necessary. Based on the identified routes or alternative routes, the automatic garbage truck leaves its current position and reaches the position of the sensorized waste collector container. Additionally or alternatively to checking the presence of perturbing events affecting the identified compliant route, the management system 125 may check the presence of perturbing events affecting the mobile network (for example, a local increase in the data traffic that determines congestion issues), in which case additionally or alternatively to the identification of new compliant routes, the management system 125 may assign additionally radio resources or redistribute the radio resources already assigned.

Step 425) The management system 125, taking into account the mobile network information provided by the mobile network information module 205 and/or the vehicle fleet information provided by the vehicle fleet information module 210 and/or the radio state information provided by the radio state information module 215, may arrange (or cause the base station to arrange) the radio resources (and, preferably, the radio control procedures) of the mobile network—however, the arrangement of the radio resources may be performed in response to any service or communication requested by the customers and/or vehicles of the mobile network. For example, the mobility management procedures can take into account in advance the deterministic route of the customer as well as the context information deriving by the knowledge of the overall vehicular and customer densities derived by the localization module 220. Additionally or alternatively, the arrangement of the radio resources may be performed in response to the alternative compliant route(s) possibly identified at step 420).

Step 430) When reached the position of the sensorized waste container the automatic garbage truck empties the container and then, according to the requests received by the control room of the local waste company, the management network performs again steps 405 to 430 in order to bring the automatic garbage truck to the garbage dump (if full) or to the position of another sensorized waste container to be emptied.

Exemplary use case (iii): a human customer requires a top class transport service. In a way analogous to what is already done for the current telecommunications services, where the customers, e.g. according to the cost of their subscription, can be classified in different classes of priority (e.g., gold, silver and bronze), a similar approach can be adopted by the management system 125 for the transport service. On the basis of a subscription profile or on the basis of a specific payment related to the currently requested transport service, the management system 125 can give a higher priority to a requesting customer belonging to a predefined class of priority (e.g., a "gold customer") by addressing the corresponding compliant vehicle toward a dedicated route (such as a less crowded lane) according to the information retrieved from the traffic management module 250.

Exemplary use case (iv): transports in emergency situations. A special situation of the exemplary use case (iii) can occur in case of emergency transports provided through special self-driving vehicles (e.g., ambulances), whose information is contained in the special vehicle module 240. In this case, similarly to the exemplary use case (iii), the vehicles can be classified with different classes of priority according to an importance or urgency of the offered transport service (for example, an ambulance may be associated with a higher priority than an automatic self-driving garbage truck). In addition to the selection of the shortest paths and less crowded lanes of exemplary use case (iii), the traffic management module 250 may act in a proactive way in order to free the routes in advance (for example, by stopping other vehicles at cross roads or changing the traffic lights signals, e.g. based on the infrastructure information provided at the infrastructure module 248).

In the exemplary use cases (i), (iii) and (iv) the automatic vehicles or special vehicles are parked in respective parking lots. Preferably, the management system 125 is also configured to manage the parking lot population. More preferably, as mentioned above, the management system 125 manages the population of the parking lot (e.g., by associating the vehicles of the fleet to respective parking lots) based on a density/distribution of the data traffic of the mobile network. Even more preferably, the density/distribution of the data traffic of the mobile network is estimated through the knowledge of the customer position (for example on the basis of the information contained in the localization module 220) and/or of the serving cells associated with the customers (for example, the cells from which the customer calls are originated, which information is for example available in the localization module 220 through the "Operation and Maintenance" (O&M) protocols or procedures of the mobile network).

According to an exemplary, but not limiting embodiment of the present invention, the management system 125 manages the vehicle population of the parking lot based on the following steps:

Step 1: at the beginning a number $V_{TOT}$ of vehicles are uniformly distributed over P parking lots (such that a number $V_{TOT}/P$ of vehicles are provided in each parking lot);

Step 2: the data traffic density/distribution over the served area is estimated, e.g., through the knowledge of the customer position and/or through the information about the cells from which customer calls or internet connections are originated;

Step 3: a Voronoi diagram covering the entire served area is formed by partitioning the served area in P regions (i.e., the number of zones of the served area is equal to the number of parking lots) based on distance to reference points, wherein advantageously the distance is the road distance and each parking lot site is used as a reference point. In this way, for each parking lot site, there is a corresponding region P comprising all the points (of the served area) closer to that parking lot site than any other;

Step 4: the portion of data traffic in each region around a corresponding parking lot site is estimated according to a ratio between the data traffic $T_P$ associated with that region and the total data traffic $T_{TOT}$ associated with (e.g., originated in) the served area;

Step 5: the vehicles, once completed a transport service, are addressed to a parking lot (which becomes its associated parking lot) in order to reach the condition $T_P/T_{TOT}=V_P/V_{TOT}$, where $V_P$ is the number of vehicles parked at that parking lot site (the condition $T_P/T_{TOT}=V_P/V_{TOT}$ meaning that the ratio between the data traffic associated with a region and the data traffic associated with the served area corresponds or substantially corresponds to the ratio between the number of vehicles currently parked at the parking lot associated with that region and the number of vehicles in the served area);

Steps 3 and 4 are continuously repeated in order to track the customer data traffic density fluctuations.

Preferably, as mentioned above, the above described tessellation of the served area is also exploited in order to identify immediately the nearest parking lot with respect to the location of a customer asking for a transport service.

Naturally, in order to satisfy local and specific requirements, a person skilled in the art may apply to the present invention many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the present invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the present invention may be incorporated in any other embodiment as a matter of general design choice.

More specifically, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A method for managing data traffic of customers and self-driving vehicles, wherein the customers and the self-driving vehicles are connected to a mobile communication network, comprising:
   receiving a transport request by a requesting customer;
   processing the received transport request and identifying, among the self-driving vehicles, a compliant vehicle that is compliant with the transport request;
   identifying a compliant route, compliant with the transport request, to be taken by the identified compliant vehicle from a starting position to one or more target positions set out in the transport request, controlling the compliant vehicle to autonomously perform a transport service via the identified compliant route according to said transport request, and during said transport service, jointly arranging radio resources of the mobile communication network for both (1) the customers, which are physically distinct from the self-driving vehicles, for a service other than the transport service and (2) the self-driving vehicles connected to the mobile communication network according to information about the mobile communication network, information about the compliant vehicle, and information about a radio state in the mobile communication network, wherein said identifying a compliant vehicle, said identifying a compliant route, and said controlling the compliant vehicle to autonomously perform a transport service are based on said information about the mobile communication network, said information about the compliant vehicle, and said information about a radio state in the mobile communication network between the customers, between the vehicles, and between the customers and the vehicles, and said identifying a compliant route further comprises:

checking the presence of perturbing events and an impact thereof on the identified compliant route, and identifying a further compliant route alternative to the compliant route if, as a result of the perturbing events, the identified compliant route is no longer compliant with the transport request.

2. The method according to claim 1, wherein said checking the presence of perturbing events and an impact thereof on a traffic of the identified compliant route and said identifying a further compliant route alternative to the compliant route are carried out before causing the compliant vehicle to perform the transport service and/or during the transport service.

3. The method according to claim 1, wherein said arranging radio resources further comprises arranging radio resources of the mobile communication network for the customers and the self-driving vehicles connected to the mobile communication network according to the identified further compliant route.

4. The method according to claim 1, wherein said information about the mobile communication network comprises at least one among:
adopted frequency bands;
used bandwidths;
radio transmission parameters;
set of radio resource management procedures;
context-aware reconfigurations; and
distribution of mobile communication network functionalities.

5. The method according to claim 1, wherein said identifying a compliant vehicle comprises:
identifying a vehicle, among the self-driving vehicles, that matches with transport features set out in the transport request, and/or
identifying a vehicle, among the self-driving vehicles, that is as near as possible to the starting position.

6. The method according to claim 1, wherein said starting position is a current position of the requesting customer or an arbitrary position set out by the requesting customer in the transport request.

7. The method according to claim 1, further comprising classifying the customers according to classes of priority, said identifying a compliant route comprising identifying or generating a dedicated route for the requesting customer if the requesting customer belongs to a predefined class of priority.

8. The method according to claim 7, wherein said classifying the customers according to classes of priority comprises classifying a human customer according to a respective subscription cost and/or classifying a vehicle according to an importance or urgency of the transport service.

9. The method according to claim 1, further comprising associating the self-driving vehicles to respective parking lots based on a distribution of the data traffic of the mobile communication network.

10. The method according to claim 9, further comprising estimating said distribution of the data traffic of the mobile communication network according to customer position and/or associated serving cells.

11. The method according to claim 10, further comprising partitioning an area covered by the mobile communication network in a number of regions each one associated with a respective parking lot according to a Voronoi diagram, said estimating the distribution of the data traffic of the mobile communication network being also based on a ratio between the data traffic associated with each region of the area and the data traffic associated with said area.

12. The method according to claim 11, wherein said associating the self-driving vehicles to respective parking lots comprises, for each region of the area, associating a vehicle to the parking lot associated with that region of the area if the ratio between the data traffic associated with that region of the area and the data traffic associated with said area substantially corresponds to a ratio between a number of self-driving vehicles currently parked at that parking lot and a number of vehicles within said area.

13. The method according to claim 1, wherein the checking for perturbances and identifying of the further compliant route are performed continuously throughout the performance of the transport service.

14. A system for managing data traffic of customers and self-driving vehicles, wherein the customers and the self-driving vehicles are connected to a mobile communication network, the system comprising:
a processor configured to:
receive a transport request by a requesting customer;
processor the received transport request and identify, among the self-driving vehicles, a compliant vehicle that is compliant with the transport request;
identify a compliant route, compliant with the transport request, to be taken by the identified compliant vehicle from a starting position to one or more target positions set out in the transport request;
control the compliant vehicle to autonomously perform a transport service via the identified compliant route according to said transport request;
during said transport service, jointly arrange radio resources of the mobile communication network for both (1) the customers, which are physically distinct from the self-driving vehicles, for a service other than the transport service and (2) the self-driving vehicles connected to the mobile communication network according to information about the mobile communication network, information about the compliant vehicle, and information about a radio state in the mobile communication network, wherein
the processor identifies said compliant vehicle, identifies said compliant route, and causes the compliant vehicle to autonomously perform the transport service based on said information about the mobile communication network, said information about the compliant vehicle, and said information about a radio state in the mobile communication network between the customers, between the vehicles, and between the customers and the vehicles, and to identify the compliant route the processor is further configured to:

check the presence of perturbing events and an impact thereof on the identified compliant route, and identify a further compliant route alternative to the compliant route if, as a result of the perturbing events, the identified compliant route is no longer compliant with the transport request.

15. The system according to claim 14, wherein the processor is further configured to continuously check for perturbances and identify the further compliant route throughout the performance of the transport service.

* * * * *